Figure 1:
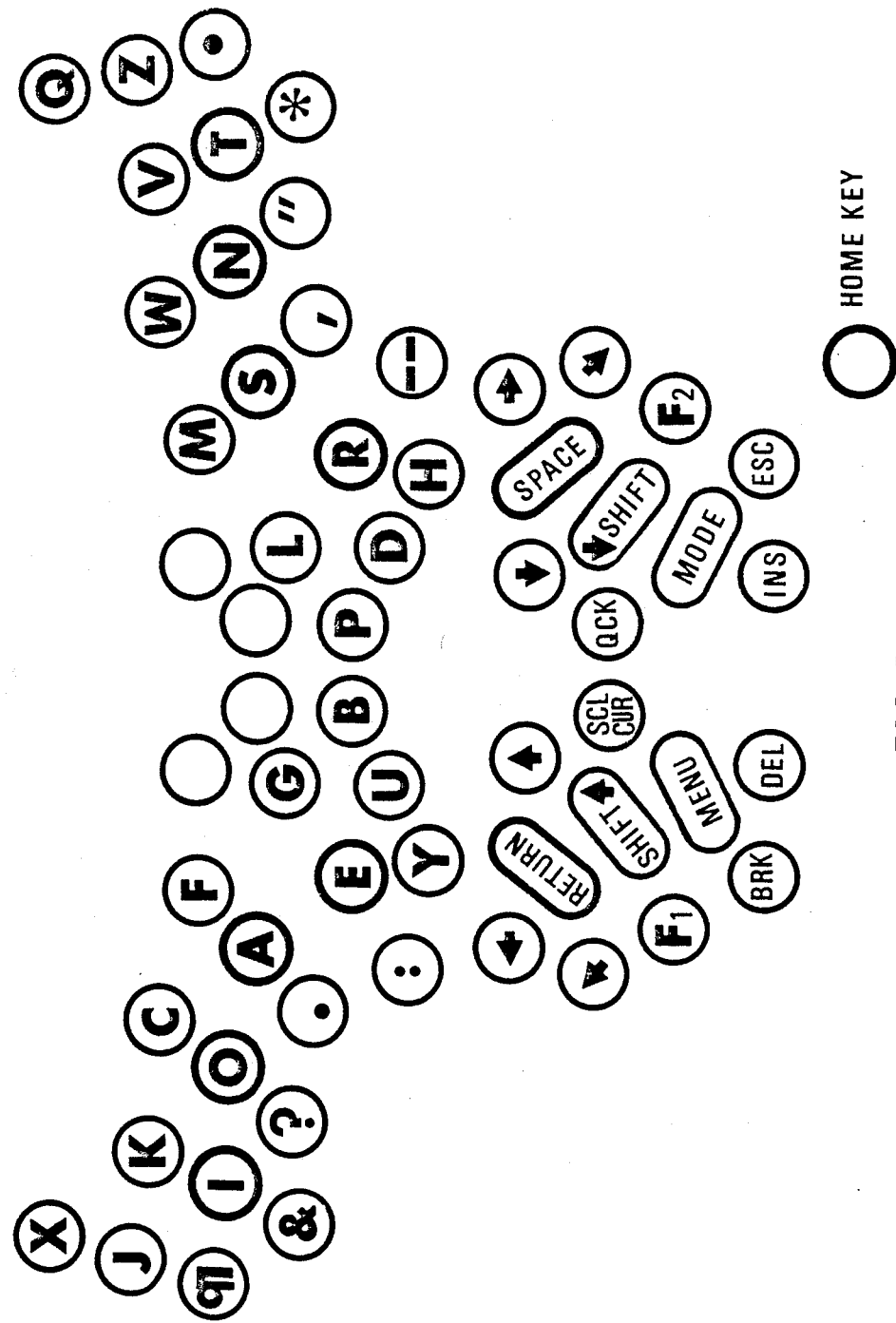

United States Patent [19]

Diernisse H. V.

[11] Patent Number: 4,824,268

[45] Date of Patent: Apr. 25, 1989

[54] ERGONOMIC KEYBOARD

[76] Inventor: Diernisse H. V., 9 Kaufman Dr., Westwood, N.J. 07675

[21] Appl. No.: 91,290

[22] Filed: Aug. 27, 1987

[51] Int. Cl.⁴ .............................................. B41J 5/10
[52] U.S. Cl. .................................... 400/486; 400/489
[58] Field of Search ................ 400/488, 489, 481, 484

[56] References Cited

U.S. PATENT DOCUMENTS

| | | | |
|---|---|---|---|
| 3,771,636 | 11/1973 | Kerns, Jr. | 400/481 X |
| 3,945,482 | 3/1976 | Einbinder | 400/489 X |
| 4,081,068 | 3/1978 | Zapp | 400/489 X |
| 4,579,470 | 4/1986 | Casey | 400/489 |

FOREIGN PATENT DOCUMENTS

| | | | |
|---|---|---|---|
| 972465 | 10/1959 | Fed. Rep. of Germany | 400/489 |
| 1279693 | 10/1968 | Fed. Rep. of Germany | 400/489 |
| 2041295 | 9/1980 | United Kingdom | 400/489 |

OTHER PUBLICATIONS

"Use Two Hands", *Popular Science*, p. 162, Mar. 1984, received on PTO 2/21/84.

"Digital X Typewriter Keyboard" by Conway, *IBM Technical Disclosure Bulletin*, vol. 18, No. 12, May 1976.

Primary Examiner—Paul T. Sewell
Assistant Examiner—Moshe I. Cohen

[57] ABSTRACT

An ergonomic keyboard that is suitable for all devices interfacing with a keyboard; and that is able to transmit on unlimited amount of information including the more than 50 alphabets of the world, numbers, other symbols, programing, and operational information. All information is grouped into modes, such as the capital letters of the Latin alphabet, and any information bit in a particular mode that the keyboard is in can be entered with one keystroke. The keyboard is ergonomically designed to take maximum advantage of the shape, dexterity, and strength of the hands and fingers so that the majority of the fingers on both hands are always naturally positioned on the home keys, and so the reaching to the other keys is natural and effortless. The ergonomic design and optimum distribution of the information bits on the keys makes the transfer of information on this keyboard the fastest possible with the least amount of effort and the least amount of errors, and it also makes the learning the fastest and easiest possible.

8 Claims, 3 Drawing Sheets

ERGONOMIC KEYBOARD

This application is a continuation-in-part of application Ser. No. 697,140, filed 2/1/85, now abandoned.

References Cited

U.S. PAT. DOCUMENTS

| | | |
|---|---|---|
| 556,422 | 3/1896 | von Kunowski |
| 1,138,474 | 5/1915 | Heidner |
| 2,040,248 | 5/1936 | Dvorak & Dealy |
| 3,698,532 | 10/1972 | Dodds |
| 3,929,216 | 12/1975 | Einbinder |
| 3,945,482 | 3/1976 | Einbinder |
| 4,081,068 | 3/1978 | Zapp |
| 4,244,659 | 1/1981 | Malt |
| 4,579,470 | 4/1986 | Casey |

FOREIGN PATENT DOCUMENTS

| | | | |
|---|---|---|---|
| 174678 | 1/1935 | Muther | Switzerland |
| 972,465 | 10/1959 | Bruckschen | W. Germany |
| 1,016,993 | 1/1966 | IBM | United Kingdom |
| 1,279,693 | 10/1968 | La Due | W. Germany |
| 2,017,063 | 4/1970 | Absam | W. Germany |
| 2,041,295 | 10/1980 | Marsan | United Kingdom |

OTHER DOCUMENTS

| | | |
|---|---|---|
| IBM Tech. Discl. | 5/1976 | Conway |
| Popular Science | 3/1984 | Use Two Hands |
| Studies of Typing | 9/1982 | Gentner et al |

BACKGROUND

Field of Invention

This invention is an improved input keyboard ergonomically designed to equalize the effort and time required of each finger in relation to that finger's shape, dexterity, and strength; with all the fingers resting on or reaching all the keys naturally, with the least amount of effort possible, and in the fastest time possible. An unlimited number of symbols and operating bits grouped into modes can be entered into any device controlled by a keyboard. The assignment of the bits in any mode among the keys permits the fastest possible entry. 2. Description of the Prior Art The standard, so-called QWERTY, keyboard for transmitting of information is very inefficient. It typically has 44 keys in two shift modes for the transmission of 88 characters and 15 to 20 other keys and levers for such funtions as spacing, mode shifting, and paper adjusting. With minor modifications this keyboard is used around the world and normally has four parallel rows of keys in a rectangular pattern.

With more sophisticated typewriters and computers the keyboard must perform more functions and transmit more types of information. To do this more keys, levers, and other control devices have been added; so that there now are keyboards with more than 125 keys in addition to the other devices. In addition, each key often has to perform more tasks. With the use of shift, control, alternate, and other mode changing keys; it is now common to have each key perform four or more tasks.

Very few typists ever learn to operate the standard four row keyboard efficiently, but the so-called improvements make it almost impossible to enter information automatically by what it commonly called touch typing. This has slowed down the transmitting of information and increased the number of errors produced. Other devices, such as the mouse and joysticks, have not helped to solve the problem.

Many have tried to invent the optimum keyboard by changing its shape, the relative position of the keys, and the assignment of the characters to the keys. However, they have all failed. The optimum keyboard must be capable of transmitting in excess of 3000 bits of information in more than 100 groups; ranging from alphabets and graphic symbols to programing and mathematical operators. The optimum keyboard should also be capable of having information entered quickly and correctly, it should be suitable for use with all types of equipment requiring information transfer, and it should be easy to learn and operate. The present invention is capable of doing all of this.

All of the existing and proposed keyboards fail being optimum because the distribution of the symbols and functions among the various keys is incorrect for the optimum entering of information. They fail because they do not separate the control and operating functions. They fail because they are designed with geometric elements such as straight lines and circles, and the fingers and hands are shaped irregularly. Consequently, the fingers do not touch and reach the keys naturally, and they must stray from the home keys and thus are unable to locate the correct keys consistently. They fail because the keys are placed equidistant from each other, and the normal and natural finger travel varies with the direction traveled and among the fingers. They fail because there are too many keys, and the operator becomes confused as to which key to use and where to located that key. They fail because the finger and hand loads are unbalanced; causing the weaker fingers and hand to become more tired than the stronger ones. They fail because they are only able to transmit a limited number of information bits equal to the number of keys times the number of mode changing keys and their combinations; with the mode changing keys limited to the shift, control, alternate, and similar keys. The present invention overcomes all of these failures.

The arrangement of the characters is on a board is a main determinant of how fast information can be transmitted, how easy a board can be learned and memorized, how error prone the board is, and how fatiguing it is to operate. The most used group of information if the Latin alphabets, but the conclusions about the Latin alphabets applies to all the other groups of information.

Before discussing the arrangement of the characters it is necessary to look at the dexterity and strength of the hands and fingers. Experience tells us that the strongest and most dexterous hand and fingers can enter information the fastest, with the least errors and fatigue, and they can learn and memorize tasks faster than the weaker and clumsier hand and fingers. That means that the most frequently used characters should be located under the fastest and strongest fingers.

About 85% of the population is right-handed, about 10% is left-handed, and about 5% is ambidextrous. Although it is just as easy to design a keyboard favoring a minority of the population, for now, we are limiting our discussion to the optimum keyboard for the majority. There are no absolute values of the difference in strength and dexterity of an average person's fingers and hands because of the many factors involved, but tests indicate that the average of the entire population is in the order of six to five in favor of the right hand. That means that the right hand can do six things in the same time as the left hand does five things with the same effort. Or put another way, in the same period of time, the right hand should do about 55% of the keyboard strokes, and the left hand should be about 45%. However, it is doubtful if there would be any measurable difference if those figures varied 2 or 3%; so we can assume the optimum percentage for the right hand to be between 52 and 58.

To simplify our discussion of the fingers we will code them with the letter L for the left ones and the letter R for the right ones. We will further code them with the numerals 1 to 5 starting with the thumb.

Finger R1 on a right-handed person is the fastest, and an average person can easily learn to tap six strokes a second in a relatively short period with this finger. Six strokes a second correspond to 72 five letter words a minute, and it is the maximum an average person will ever do. That same person can tap R2 at the same speed, R3 one or two percent slower, R4 about three percent slower, and R5 about seven percent slower. In relation to R1, L1 is about fifteen percent slower, L2 and L3 about eighteen percent slower, L4 about twenty-five percent slower, and L5 about forty percent slower.

The above information is important in determining the time required to stroke the home keys one at a time and to some extent determine how many strokes it takes for a finger or hand to reach a certain level of fatigue; but most entering of information requires the pressing of two keys, digraphs, in rapid succession. A much smaller amount of information requires the pressing of three or more keys in succession, but because of the very small percentages involved, because very few typists ever do these sequences, and because the overall combinations do not change if we include them in our calculations, we will ignore these sequences.

Even though an operator may be able to stroke two particular keys faster than two other particular keys, it does not necessarily follow that it will happen, and studies of what happens in practice indicates that it is desirable to have the letters of a digraph entered by alternate hands, and failing that to have them entered by alternate fingers.

The Gentner et al study of 11 experienced typists with speeds between 60 and 110 words per minute and averaging 90 words per minute typed digraph interstrokes at the following times. Two hand mean time of 114 milliseconds (msec.) with a range of 90–157 msec. Two finger mean time of 131 msec. with a range of 99–215 msec. One finger double character mean time of 157 msec. with a range of 148–160 msec. One finger home key and adjacent key characters mean time of 185 msec. with a range of 179–222 msec. One finger adjacent and adjacent key characters mean time of 192 msec. with a range of 179–251 msec.

The digraph frequency in different languages vary greatly but is always related to the frequencies of the individual letters. English is the most used Latin-alphabet language, its digraphs are representative, and it is selected for this discussion.

The average word consists of about 4.35 letters, 0.13 punctuation marks, and 1.05 spaces. That means that about 21% of all digraphs involve non-letters, and on the present invention they are executed on the optimum combination of keys. These digraphs act as natural stops for the average typist, and as such they are not stroked in a rhythmic sequence. For an average typist the same natural stops, or breaks in the rhythmic sequence, occurs when shifting for an uppercase letter, entering a return, or entering another symbol such as a numeral. The percentage of these stops for most text is in the order of 35 to 40%. The number of digraphs from one study to another varies, but the relative frequencies are fairly constant, and when are able to gauge the numbers within a percent or two.

Because of the character assignment to the keys of the present invention the entering of information by the non-thumb fingers is done the most efficient. The thumbs function essentially as independent units and also function at their optimum speeds on the keyboard of the present invention.

The average frequencies determined from the 18 major Latin alphabets are as follows, in percent: space 18; E 11; A and O each 7; I,N,R, and S 5 each; T 4; D and L 3 each ; C,F,G,H,M,P,U,W, and return, 2 each; B,K,V,Z, comma, period, and shift, 1 each ; and all the others account for 4. The 2% for the return is based on information entered on a typewriter keyboard. It is much less than 1% for information entered on a device capable of wraparound entry. With this information it is possible to have the ten home keys be responsible for anywhere from two thirds to three quarters of all keystrokes, depending on the language and type of text, and it is possible to arrange the characters in such a manner that the maximum number of digraphs are sequenced on alternate hands.

TABLE 1

LEADING KEYBOARD CHARACTER ARRANGEMENTS
In %

| Keyboard | Finger | | | | | | | | | | Total | |
|---|---|---|---|---|---|---|---|---|---|---|---|---|
| | L5 | L4 | L3 | L2 | L1 | R1 | R2 | R3 | R4 | R5 | L | R |
| QWERTY | 8 | 7 | 15 | 19 | 9 | 9 | 13 | 5 | 11 | 4 | 58 | 42 |
| Von Kunowski | 6 | 1 | 4 | 17 | 11 | 22 | 18 | 4 | 5 | 9 | 39 | 61 |
| Muther | 2 | 5 | 8 | 20 | 9 | 9 | 24 | 13 | 5 | 5 | 44 | 56 |
| Dvorak & Dealy | 8 | 8 | 12 | 11 | 9 | 9 | 11 | 8 | 11 | 11 | 49 | 51 |
| Dodds | 9 | 9 | 12 | 11 | 2 | 19 | 11 | 8 | 11 | 7 | 43 | 57 |
| Einbinder No. 1 | 7 | 8 | 12 | 10 | 23 | 10 | 9 | 6 | 7 | 9 | 59 | 41 |
| Einbinder No. 2 | 9 | 6 | 13 | 9 | 23 | 9 | 8 | 8 | 8 | 7 | 60 | 40 |
| Malt | 9 | 6 | 6 | 11 | 12 | 21 | 12 | 5 | 7 | 9 | 45 | 55 |
| Bruckschen* | 7 | 2 | 2 | 6 | 14 | 18 | 6 | 2 | 2 | 7 | 31 | 35 |
| Casey | 0 | 0 | 6 | 23 | 12 | 10 | 27 | 15 | 5 | 0 | 42 | 58 |
| Marsan* | 9 | 11 | 7 | 9 | ? | ? | 11 | 3 | 6 | 19 | 36 | 39 |
| Diernisse | 6 | 9 | 9 | 16 | 3 | 19 | 15 | 9 | 7 | 6 | 43 | 57 |

*Do not show return, space and other essential elements, so the loads for the thumbs and total hand loads are understated.

The percent distribution of characters on the keys of the various keyboards include the present invention.

The figures do not always add up to 100% because of rounding.

Besides the present invention there are only four of the keyboards which have distributed the characters between the hands within the 51 / 48 to 58 / 42 range previously determined to be the optimum. Of these, Muther have five rows of keys in a near rectangular arrangement, which is very inefficient. Dodds have almost the same shape keyboard with one less row, but that is still very inefficient. All, except the present invention, suffers from a poor distribution of the finger load.

If we take all the keyboards of the prior art and calculate the time for the interstrokes of digraphs from standard English test, using the mean times from the Gentner et al study, we find that only the Dvorak board is faster, and it by only 3%.

There are roughly 160 characters in the Latin alphabets, and generally speaking half of them are uppercase letters and the rest are lowercase letter. All of the alphabets have 44 of the characters. The Q, W, X, and Y with their corresponding lowercase letters are absent from some of the less used alphabets, but not all of them from the same alphabets. Some characters are characteristic to only one or a few alphabets. A typical example is the Danish and Norwegian O with a slash diagonal through it. The largest portion of the characters found only on a limited number of alphabets are standard characters with an accent mark such as the cedilla or umlaut. There are ten such accent marks.

SUMMARY

It is an object of this invention to be able to enter any known symbol and operation suitable for keyboard entry with one stroke when the keyboard is in the mode to which the said symbol or operation belongs. A mode is a group of information bits consisting of symbols or operations, and is either preprogramed or operator programed. Modes are either master modes representing broad subject areas or submodes representing a portion of a master mode subject. The number of master modes are equal to the number of keys operated by the non-thumb fingers and may be called into action by pressing one or two keys. A submode in a given master mode may be called into action by pressing one or more keys. The number of information bits in a mode are always equal to or less than the number of keys entering the information bits. A typical mode contains the uppercase letters of English alphabet, a Japanese alphabet, a set of instructions, or a group of mathematical operators.

A second object of this invention is to have the fingers rest on or reach all the keys naturally on an ergonomically designed keyboard; with the majority of the fingers on each hand always located on the home keys; so that inputting is easier learned, faster, done with less effort, and generating less errors than on any other keyboard.

A third object of this invention is to have a number of boards with the minimum number of keys required to transmit the information and control bits; each designed ergonomically to fit the irregular architecture of the hands and fingers of an individual or a group.

A fourth object of this invention is to arrange the symbols, operations, and control functions on the keys in such a manner that the keystroke efforts and response times are at a minimum and apportioned among the fingers and hands according to their dexterity, strength, and shape; and in such a manner that the maximum amount of sequenced entries is done by alternate hands, and when that is not possible, to have the maximum amount of the remaining sequenced entries done by alternate fingers; with the maximum amount of one finger sequenced entries done so that one of the entries is located on a home key.

A fifth object of this invention is to have the most frequent information and control bit assigned to the home key of the most dexterous finger in its respective group; with each next most frequent occuring bit assigned to the home key of each next most dexterious finger, and subsequently to have each next most frequent occuring bit assigned to each next most easily reached key.

A sixth object of this invention is to assign a bit occurring in different modes and different control groups to the same key.

A seventh object of this invention is to limit the entry of any bit to one key.

An eighth object of this invention is to arrange the symbols, operations, and control functions which are positive, even, or normally appearing to the right on the right half of the keyboard; and to arrange those which are negative, odd, or normally appearing to the left on the left half of the keyboard.

A ninth object of this invention is to locate the most frequency consonants of the Latin alphabet modes on one side of the keyboard and to locate the vowels on the other side of the keyboard.

A tenth object of this invention is to physically separate the key groups used for entering of the control functions from the key groups used for entering the information bits. The preprogramed and operator programed control functions which manage the hardware and software are entered by the thumbs, and the information bits from the modes are entered by all the other fingers.

DRAWINGS

The drawings show the optimum arrangement of the keys, on a microcomputer, for a person of average height. Three of the literally thousands of modes possible are shown.

Figure 2:
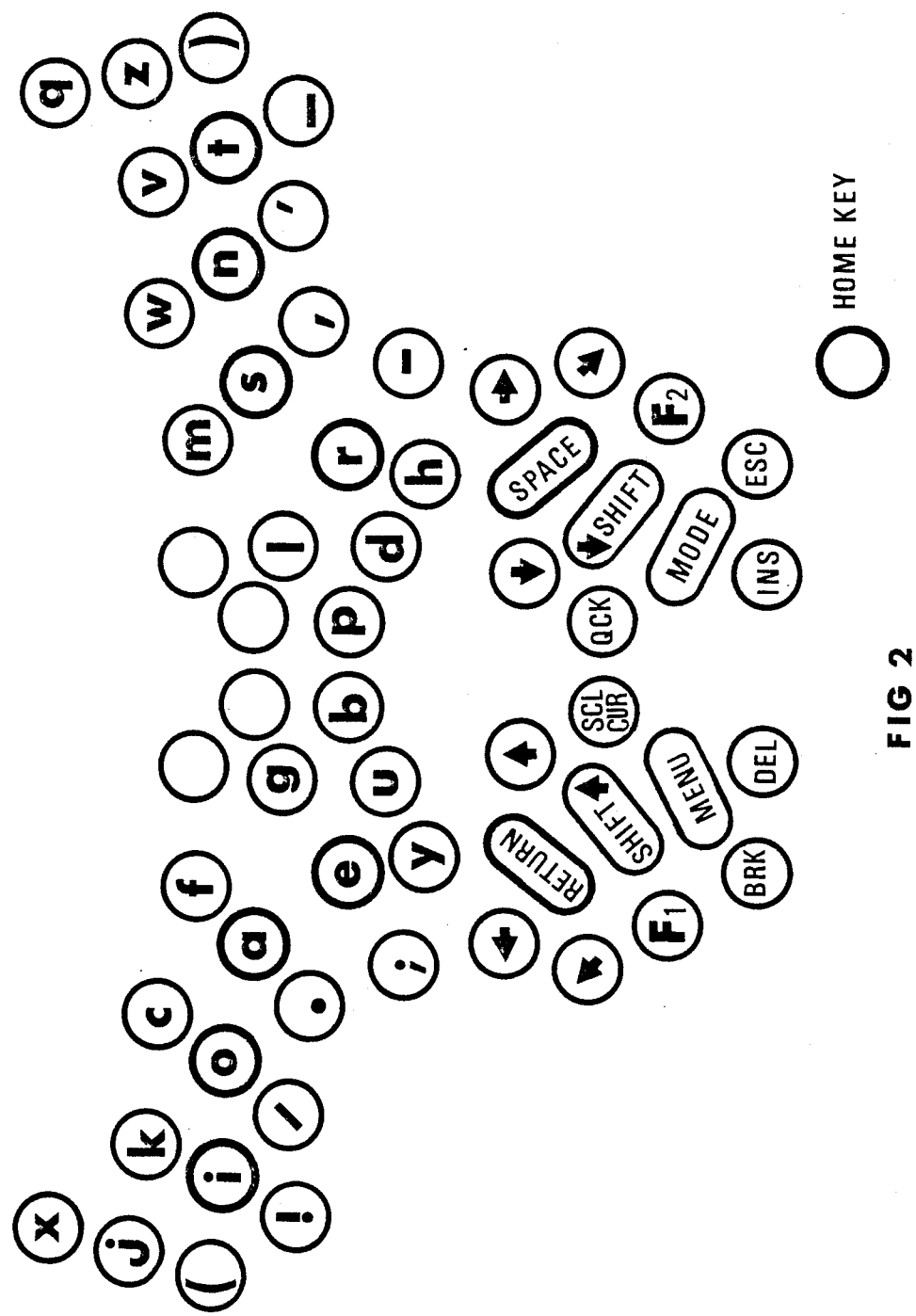
Figure 3:
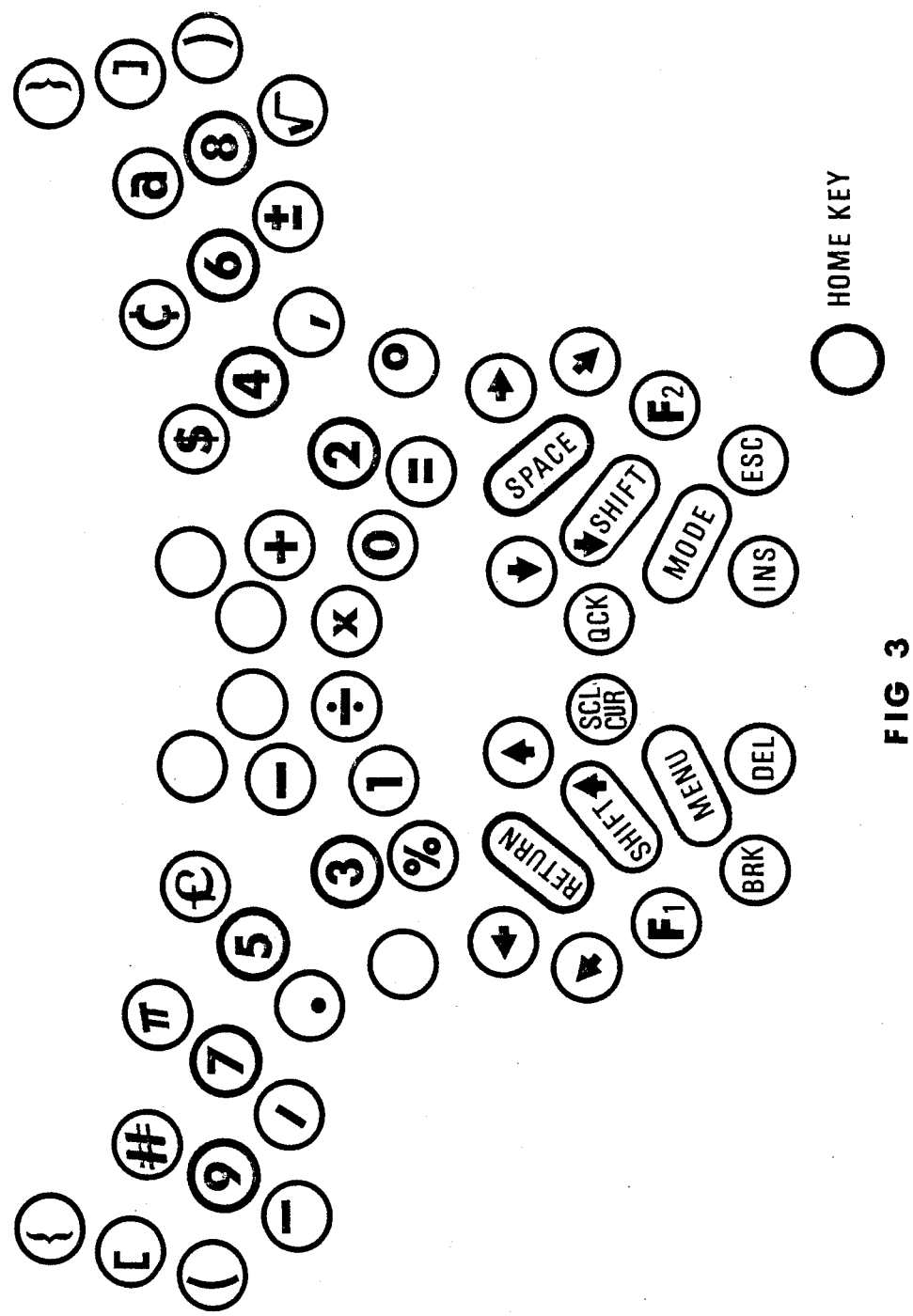

FIG. 1 shows the English uppercase letter mode.
FIG. 2 shows the English lowercase letter mode.
FIG. 3 shows the number mode.

DESCRIPTION

The keys of this ergonomically designed keyboard are irregularly arranged, without purposely using geometrical elements, to fit the architecture of the fingers and hands so that the fingers naturally rest on home keys and naturally reach all the other keys; with a majority of the fingers of each hand always located on the home keys, and typically as shown on the drawings. In the preferred design there is an imaginary dividing line down the middle of the board from the top to the bottom; with each side having two groups of keys separated from each other. The top groups are the information keys, operated by the non-thumbs, and may be either preprogramed or operator programed. The purpose of the information keys is to transmit information bits consisting of characters, operations, or sequences of those. The bottom groups are the control keys, operated by the thumbs they control the hardware and software, and with the exception of the programable function keys they perform the same functions in all modes on a particular device, and can be permanently marked with the functions they perform. For instance, for a microcomputer, as shown in the drawings, the center control keys can function as follows: left top, return; left middle, mode shift-up—for instance, it can shift up from a lower case Latin alphabet to an upper case Latin alphabet; left lower, menu—for instance, it can display the menus, window options, and operating instructions; right top, space; right middle, mode shift-down; right lower, mode—for instance, it can show the modes, let any mode be called up by using the information keys, and show the charaters and commands for the mode operating at any particular time. The other control keys can perform the operations as shown in the drawings, and the function keys can be programed to perform function either alone as individuals or in conjunction with other keys. The number of keys are limited to the maximum number operated naturally within the above parameters and to the minimum number required to manage the control functions and transmit the required modes. The boards can be ergonomically custom designed to fit the requirements of any individual or groups and any device or program.

An unlimited number of information bits grouped into modes can be entered into any device interfacing with a keyboard. Each mode contains the same number or less bits than the number of keys in the top groups, to which it is assigned, so that any bit in a mode is entered with one keystroke. A group of mastermodes, equal to or less in number than the the number of keys in the top groups of keys and containing the broad subject areas of the universe of information capable of being entered into a keyboard, are entered with one or two keystrokes. Each mastermode may contain an unlimited number of submodes entered with one or more keystrokes.

The assignment of information and control bits, in the preferred design, is done by balancing the time and effort of the fingers in relation to their dexterity, strength, and shape; so that it is easier, faster, and less fatiguing to learn and operate the keyboard, and so that less errors are generated. The bits occurring most frequent are assigned to the home keys, and of those the most frequent bit in its respective group is assigned to the most dexterious* finger with the subsequently most frequent bit assigned to the next most dexterious finger, and with the remaining bits assigned to the non-home keys the same ways, the assignment of the bits are done so that the maximum number of sequenced entries are done on alternate hands, and of the remaining sequences the maximum is done on alternate fingers. Of the remaining one finger sequenced entries* the maximum number is done with one part on a home key. The right half of the keyboard is the positive side and the left half is the negative side. Whenever a key performs a positive task such as moving a cursor to the right or do multiplication, it will be on the right half, keys performing negative tasks will be on the left half. A bit appearing on two or more modes or keyboards will always be on the same key, and a bit can only be entered with one key. The most frequent consonants in the Latin alphabet is on the right half of the keyboard and the vowels are on the left half.

Other features which can be programed into different modes include, but are not limited to, the overprinting of characters and automatic sequencing. Overprinting of characters can be useful for the printing of diacritics such as the acute accent with a French e. It can be done in the English alphabet mode by printing an apostrophe with the overprint feature before printing the e. Automatic sequencing can be programed into particular symbols such as automatically getting two spaces and a uppercase letter after a lowercase period. An operator would then have to use an uppercase period to get a normal one space after the period.

The preferred design include a wrist rest located in the two lower corners of the keyboard; a device for changing the slope of the board; key tops dished to the shape of the fingers, or in the case of the center control keys, shaped for a comfortable fit of the thumb phalanges; the home keys dished one millimeter deeper than the other keys; different spring tension on the home keys from that of the others keys, so as to need less force to activate the non-home keys, but still prevent the home keys from being activated by the normal force of the fingers resting on them.

The best arrangement for a person of average size, who is five feet six inches (168 centimeters) tall, is for the center to center distance from the top outermost key to the lowest center key on each half to be about 6 inches (152 millimeters). The maximum expected variation in size of the operators is plus or minus ten percent, and the keyboard can be changed to suit any other size or shape. The space between the two halves can be changed to suit.

Other option suitable for use with this board include, but is not limited to, having the board touch sensitive with the top of the keys integral and flat with the board; changing the heights of the various keys; changing the switch action of the various keys, for instance, the home keys may be operated vertically and the keys above them operated horizontally; and keys may be chorded so that pressing two or more keys together produces a new bit of information. The design can also include having the key tops on a double concave surface, similar to the surface of the inside of an egg.

The most used modes can be grouped together by the operator. A typical example for an English alphabet user would be to have the lower case mode shown on FIG. 2 as the home mode. The uppercase mode shown in FIG. 1 would then be accessed pressing the mode shift-up key. The next mode up would then be a text formatting mode, and so on. The number mode in FIG. 3 would be accessed by using the shift-down key once; and the calculator mode, which is very similar to the number mode, would be accessed by using the shift-down key twice. For ease of accessing modes further removed the operator has the option of entering the mode function.

The three drawings show the three most used modes for English alphabet users. All other modes would be arranged using the same principles. The control keys for a particular device would remain the same, except for the function keys, and the operating keys would ideally be arranged so that between 52 and 58% of the number of information bits would be located on the right hand side of the board, and the individual finger load would be within about 10% of the finger load assigned to the English alphabet.

To learn the character arrangement on a standard keyboard for an average touch typist takes from 6 to 12 hours depending on the training method. The average typist is then able to type from 12 to 15 standard five letter words per minute for a five minute period. If we ignore the time spent training the typist for such skills as letter and manuscript formatting, the average typist will for every hour of training increase the speed by from a half to one word per minute until the speed of 60 words per minute is reached. Any improvement after that is slow. Some never improve beyond that, but the average typist eventually reach speeds of from 70 to 75 words per minute, and some exceptional typists can type in excess of 100 words per minute. However, those speeds are misleading because they are based on a typist's maximum output for a period of only five minutes. The average output over a full workday is probably closer to 30 to 33 words per minute if a typist is working on long documents consisting of simple matter with almost no numbers or other non-letter symbols. Short letters or more difficult matter cuts that speed by another 25%.

The average typist can learn the three basic modes; uppercase letters, lowercase letters, and numbers; of the present invention in about an hour and with the same type of training expect to attain the same speeds as on a standard keyboards in about two thirds the time. The average ultimate speed which can be expected on the present invention is around 90 to 95 words per minute. This is an improvement of about 25% for an average typist compared to the output on a standard board.

The increase in speed is due to both the ergonomic design of the keyboard and the efficient arrangement of the control and information bits on the keys, as well as the approximately one quarter reduction in errors. The reduction in errors is also the direct result of the ergonomic design and efficient arrangement of the information on the keys.

The ease of learning the keyboard of the present invention is readily ascertained by looking at one of the alphabet modes and table 2 while simulating typing on a full size drawing of the key arrangement with 6 inches (152 millimeters) from the center of the top outermost key to the center of the lowest center key on each half of the board.

TABLE 2

KEYBOARD EXERCISES
Repeat each exercise for three lines and use return at the end of each line

| To Learn | Type |
|---|---|
| The keys under the thumbs, index, and middle fingers | sear sear ... |
| The home and shift keys | To see rain to see rain ... |
| | So are tin so are tin ... |
| The 19 most used keys | Can I fall in a mudhole first ... |
| | Frost should melt in March ... |
| The 25 most used keys | Ghastly wave problems can be difficult ... |
| | My old man vowed the first big coup ... |
| All the letters and four most used thumb keys | Jackdaws love my big sphinx of quartz ... |
| | Joe zips down quickly from the grave box ... |

I claim:

1. A keyboard for the transmission of information and instructions comprising:

a plurality of keys irregularly arranged according to the shape of the hands in such a manner that when the bent non-thumb fingers of both hands are placed on the keyboard, each of eight home keys are located under the tip of each of the non-thumb fingers;

a plurality of keys arranged in such a manner that when the non-thumb fingers are extended from their respective home keys, each of four top center keys on each keyboard half is located under the tip of each of the non-thumb fingers;

a plurality of keys arranged in such a manner that when the non-thumb fingers are bent toward their respective wrists from their respective home keys, each of four bottom center keys on each key board half is located under the tip of each of the non-thumb fingers;

a plurality of keys arranged in such a manner that when each index finger is moved from its respective home key and toward the center of the keyboard, an inner center key is located under the tip of each index finger;

a plurality of keys arranged in such a manner that when each index finger is moved away from its home key at an angle between each respective inner center key and each respective top center key operated by the respective index finger, an inner top key is located under the tip of each index finger;

a plurality of keys arranged in such a manner that when each index finger is moved away from its home key at an angle between each respective inner center key and each respective bottom center key operated by the respective index finger, an inner bottom key is located under the tip of each index finger;

a plurality of keys arranged in such a manner that when each little finger is moved away from its home key and toward the outside of the keyboard at an upward angle, an outer center key is located under the tip of each little finger;

a plurality of keys arranged in such a manner that when each little finger is moved away from its home key at an angle between each respective outer center key and each respective top center key operated by each respective little finger, an outer top key is located under the tip of each little finger;

a plurality of keys arranged in such a manner that when each little finger is moved away from its home key at an angle between each respective outer center key and each respective bottom center key operated by each respective little finger, an outer bottom key is located under the tip of each little finger;

a plurality of keys for operation by the index fingers and located further away from the home key of each respective index finger than the respective top center key operated by the respective index finger;

a plurality of keys arranged in such a manner that when the non-thumb fingers rest on their respective home keys, the outer phalange of each thumb rest on its respective thumb home key;

a plurality of keys for operation by each thumb and arranged together with each thumb home key on an irregular home key curve on each half of the keyboard;

a plurality of keys for operation by each thumb and irregularly arranged farther away from the operator and outside each thumb home key curve; and a plurality of keys for operation by each thumb and irregularly arranged closer to the operator and inside each thumb home key curve.

2. A keyboard for the transmission of information and instructions comprising:

a plurality of keys on each half of the keyboard for the operation by the non-thumb fingers, arranged in an irregulaar curve and extended irregularly at both ends for an additional key, and called the home key curve;

a plurality of keys on each half of the keyboard for the operation by the non-thumb fingers, arranged in an irregular curve farther away from the operator than the home key curve, equal to the number of keys on the home key curve, and called the top key curve;

a plurality of keys on each half of the keyboard for the operation by the non-thumb fingers, arranged in an irregular curve closer to the operator than the home key curve, equal to the number of keys on the home key curve, and called the bottom key curve;

a plurality of keys for operation by the index fingers arranged farther away from the operator than the top key curve;

a plurality of keys on each half of the keyboard for the operation by the thumbs, arranged in an irregular concave curve, when viewed by the operator, and called the thumb home key curve;

a plurality of keys on each half of the keyboard for the operation by the thumbs, and arranged on the convex side of the thumb home key curve;

a plurality of keys on each half of the keyboard for the operation by the thumbs and arranged on the concave side of the thumb home key curve.

3. A keyboard as in claim 2:

wherein the keys for operation by the non-thumb fingers are for the transmission of an unlimited number of information bits consisting of symbols, operations, and combinations arranged in preprogramed and operator programed modes, with the number of bits in each mode equal to or less than the number of keys operated by the non-thumb finger;

and wherein the keys for operation by the thumbs are for the transmission of preprogramed and operator programed instructions for the control of the keyboard and associated hardware and software.

4. A keyboard as in claim 2:

wherein the information bits in any mode are assigned to the keys for optimum speed and ease of operation in the transfer of said information bits according to the dexterity of each finger in such a manner that the most frequent occurring bit is assigned to the home key of the most dexterous non-thumb finger, with each next most frequent occuring bit assigned to the home key of each next most dexterious non-thumb finger, and thereafter with each next most frequent occurring bit assigned to each next most easily reached key;

and wherein the instruction bits for any keyboard and associated hardware and software are assigned to the keys operated by the thumbs in such a manner that the most frequent bit is assigned to the home key operated by the most dexterious thumb, with the next most frequent occurring bit assigned to the home key of the other thumb, and with each next most occuring bit assigned to each next most easily reached thumb-operated key.

5. A keyboard as in claim 2:

wherein all information and instruction bits which are positive, even, or normal right-hand symbols and operations are assigned to keys on the right half of the keyboard;

and wherein all information and instruction bits which are negative, odd, or normal left-hand symbols and operations are assigned to keys on the left half of the keyboard.

6. A keyboard as in claim 2:

wherein the most used consonants in a Latin alphabet mode is assigned to one side of the keyboard, and the vowels are assigned to the other side.

7. A keyboard as in claim 2:

wherein the maximum number of sequenced entries are entered on alternate hands, and of the remaining sequenced entries, the maxmum is entered on alternate fingers; of the remaining one finger sequenced entries, the maximum is entered with at lest one part located on a home key.

8. A keyboard as in claim 2:

wherein the Lower Case Mode key assignments, beginning with the left key on the top key curves and progressing right are: x, k, c, f, g, b, p, l, m, w, v, and q; and on the home key curves are: j, i, o, a, e, u, d, r, s, n, t, and z; and on the bottom key curves are: (, !, /, ., ;, y, h, -(hyphen), (comma, ', _(underline), and);

wherein the Upper Case Mode key assignments are the same as the Lower Case Mode key assignments except that:   is substituted for (, & for !, ? for /, : for ;, —(m bar) for -(hyphen), " for ', * for _(underline), and ● for);

wherein the Number Mode key assignments, beginning with the left key on the top key curves and progressing right are: {, #, π, £, —(minus), +, $, ¢, @, }; and on the home key curves are: [, 9, 7, 5, 3, 1, ÷, ×(multiplication), 0, 2, 4, 6, 8, ]; and on the bottom key curves are: (, ¯(bar), /, ., blank (programable), %, =, °, ,(comma), ±, and √.

* * * * *